(12) United States Patent
Kloosterman et al.

(10) Patent No.: US 6,528,614 B2
(45) Date of Patent: Mar. 4, 2003

(54) PROCESS FOR THE PRODUCTION OF POLYAMIDE-6 FROM EPSILON-CAPROLACTAM

(75) Inventors: Ernst E. G. Kloosterman, Odoorn (NL); Albert A. A. Van Geenen, Sittard (NL); Cornelis C. L. Van Der Sluijs, Geleen (NL); Erik E. R. Peerlkamp, Emmen (NL); Theo T. K. Schulpen, Stein (NL); Ronald R. J. H. Hoenen, Geleen (NL)

(73) Assignee: DSM N.V., Heerlen (NL)

( * ) Notice: Subject to any disclaimer, the term of this patent is extended or adjusted under 35 U.S.C. 154(b) by 0 days.

(21) Appl. No.: 09/815,288

(22) Filed: Mar. 23, 2001

(65) Prior Publication Data

US 2001/0047075 A1 Nov. 29, 2001

Related U.S. Application Data

(63) Continuation of application No. PCT/NL99/00588, filed on Sep. 21, 1999.

(30) Foreign Application Priority Data

Sep. 23, 1998 (NL) .............................................. 1010161

(51) Int. Cl.$^7$ ......................... C08G 69/16; C08G 69/46
(52) U.S. Cl. ..................... 528/310; 528/312; 528/313; 528/323; 528/480; 528/481; 528/499; 528/500; 526/67; 526/68; 526/70; 526/71
(58) Field of Search ................................. 528/310, 312, 528/313, 323, 499, 480, 481, 500; 526/67, 68, 71

(56) References Cited

U.S. PATENT DOCUMENTS 4,053,457 A * 10/1977 Cordes et al. .............. 528/323
4,310,659 A * 1/1982 Yates et al. ................. 528/323
4,539,391 A * 9/1985 Pipper et al. ............... 528/323
4,540,774 A * 9/1985 Gerking et al. ............. 528/502
4,734,263 A * 3/1988 Gerking et al. ............. 528/502
5,039,786 A * 8/1991 Pipper et al. ............... 528/324
5,077,381 A   12/1991 Dellinger ................... 528/323
5,218,080 A *  6/1993 Dellinger
5,962,538 A * 10/1999 Wiltzer et al. .............. 528/323
5,973,105 A * 10/1999 Wiltzer et al. .............. 528/499
6,093,788 A *  7/2000 Born et al. ................. 528/310
6,107,449 A *  8/2000 Wiltzer et al. .............. 528/310
6,136,947 A * 10/2000 Wiltzer et al. .............. 528/310
6,320,021 B1 * 11/2001 Hildenbrand et al. ....... 528/499

FOREIGN PATENT DOCUMENTS

WO    9708223 A    3/1997
WO    9708224 A    3/1997

OTHER PUBLICATIONS

International Preliminary Examination Report, PCT/NL99/00588, Sep. 21, 1999.

* cited by examiner

Primary Examiner—P. Hampton Hightower

(57) ABSTRACT

The invention relates to a process for the production of polyamide-6 by polymerization of ε-caprolactam with full re-use of extracted caprolactam and oligomers. The extract is not subjected to a pretreatment for reduction of the cyclic dimer content. By carrying out the polymerization in two steps, the first at an elevated pressure, but lower than the vapor pressure of the reaction mixture supplied, and the second at approximately atmospheric or reduced pressure, the cyclic dimer content of the polymerizate leaving the second polymerization step is kept at a constant level. The process offers a high degree of flexibility in terms of production capacity and composition and proportion of recycled lactam in the lactam feed for the polymerization.

13 Claims, 5 Drawing Sheets

PROCESS FOR THE PRODUCTION OF POLYAMIDE-6 FROM EPSILON-CAPROLACTAM

This is a continuation of International Application No. PCT/NL99/00588 filed Sep. 21, 1999 which designated the U.S., and that international application was published under PCT Article 21 (2) in English.

The invention relates to a process for the production of polyamide-6 from ε-caprolactam, comprising
(a) the polymerization of ε-caprolactam to polyamide-6 at a temperature above the melting point of polyamide-6,
(b) recovery of polymerizate in solid form from polymerization step (a),
(c) extraction of the solid polymerizate obtained in (b), using a suitable solvent, with removal of non-converted monomer and oligomeric compounds from the polymerizate,
(d) separation of the extracted polymerizate from the extraction agent,
(e) concentration (by evaporation of the solvent) of the solution of non-converted monomer and oligomeric compounds which has resulted from the extraction and
(f) recycling of the concentrate obtained in (e) as starting material to the polymerization (a).

Such a process is disclosed in U.S. Pat. No. 4,053,457 of BASF and in Fibre Producer, June 1981, pp. 20 and 22 by G. Panks c.s. In said process the polymerization as a whole is carried out in a polymerization column (a so-called VK column), the polymerizate is washed with water, the resulting extract, which mainly consists of ε-caprolactam and a smaller fraction of oligomeric compounds, is concentrated by evaporation to a low water content and subsequently supplied, preferably as a melt, to the top of the VK column together with fresh caprolactam as starting material for the polymerization.

However, this process suffers from the drawback that cyclic dimer (CD) is formed and accumulated. If this CD is present in the polyamide-6, it may give rise to problems in the processing of the polyamide to for instance film and fibre owing to its relatively high melting point, 347° C. As a remedy for this, U.S. Pat. No. 5,218,080 of BASF, discloses a process—which was also already described in U.S. Pat. No. 4,053,457—wherein the concentrated extract to be recycled is subjected to a thermal treatment at a temperature of between 200 and 300° C. and at a pressure in excess of the vapour pressure of the concentrate. In the examples presented in said patent publications such a treatment is carried out in an autoclave for a relatively long period of 4 hours in the presence of about 20 wt. % of water. This process results in a reduction of the cyclic dimer content of the concentrate to less than 1.3 wt. % of CD, so that, if the concentrate is supplied to the polymerization column together with fresh ε-caprolactam, the CD content during the polymerization remains considerably below the equilibrium concentration of the CD in the reaction mixture. The equilibrium concentration of the CD depends, among other factors, on temperature, pressure and water content during the polymerization and under the customary polymerization conditions it lies between 0.8 and 1.0 wt. % relative to the amount of initial monomer.

In other known process embodiments the extracted monomer and oligomers are not recycled any more to the polymerization process, but subjected to a hydrolysis in a separate process line in order to convert i.e. cyclic dimer fully to ε-caprolactam. The latter process offers the advantage that the CD content of the polymerizate leaving the polymerization reactor can be kept at the lowest possible level and the polyamide-6 obtained after extraction is able to meet very strict specifications in respect of CD content, which is of importance in particular in the case of highly failure-prone applications of polyamide-6, such as fibre spinning and film drawing. The latter state-of-the-art process and other processes mentioned before in this application suffer from the drawback that a separate treatment of the extracted non-converted ε-caprolactam and CD is required, involving additional investments and expenditure.

The object of the invention under the present application is a process for the preparation of polyamide-6 in which at least full re-use of the non-converted monomer can take place without involving the necessity of the additional investment for a hydrolysis treatment of the recyclate.

A further object of the invention is a process for the preparation of polyamide-6 from ε-caprolactam which allows a highly fluctuating share of recycled ε-caprolactam concentrate with a fluctuating proportion of cyclic dimer in the ε-caprolactam feed.

These objectives of the invention are realized by carrying out the polymerization in at least two successive steps, namely
(a1) at a temperature between 220 and 285° C. and at an elevated pressure which remains below the vapour pressure of the reaction mixture supplied, with solvent being discharged via the vapour phase, for such a time that the polymerization process is initiated and
(a2) while letting down the pressure prevailing in (a1) to approximately atmospheric or, if desirable, reduced pressure, the reaction mixture obtained in (a1), further called 'the prepolymerizate', is polymerized further, at a temperature above the melting point of polyamide-6, until the required degree of polymerization is reached.

Next, the polymerizate is recovered in the customary manner from the polycondensation reactor, which will in general be a conventional so-called VK column. The polymerizate is then subjected to a washing (extraction) treatment with a suitable solvent, for instance water or methanol, optionally at elevated temperature. This involves removal of low-molecular extractable residues, mainly non-converted ε-caprolactam and various oligomeric compounds, from the polyamide-6.

The extract, which preferably has the highest possible content of extracted material, for instance 10 wt. %, is subsequently concentrated by evaporation and recycled as feed, optionally together with the extract from one or more other polyamide-6 production lines, to the prepolymerization step (a1). In the most extreme case the feed for the polymerization can consist completely of extract from several production lines.

The polymerization process of ε-caprolactam to polyamide-6 with a prepolymerization step (a) and a condensation step (b) is known per se. The current modes of embodiment of this can also be employed in the process according to the invention.

The process according to the invention is highly suitable for a continuous mode of embodiment.

Optionally, in step (a1) a catalyst is used. The commonly employed catalysts for the production of polyamide-6 from ε-caprolactam are suitable as prepolymerization catalyst, for instance allyl lactam, polyamide-6,6 salt and organic acids such as acetic acid, propionic acid and benzoic acid, phosphoric acid and phosphate salts.

Where in the present application the term 'polyamide-6' is used, it is understood to mean the homopolyamide and the copolyamides of which at least 50% of the chain units are derived from ε-caprolactam.

The concentrate is preferably recycled completely to the prepolymerization step (a1), because in this way the most stable process operation is ensured. In general fresh lactam is additionally supplied to the prepolymerization step. Depending on the requirements to be met by the polymerization process as a whole, the total amount of fresh lactam can already be present in prepolymerization step (a1). Especially if a large fraction of the lactam feed consists of recyclate it is recommendable not to introduce at least part of the fresh lactam until the polycondensation step (a2).

The process according to the invention offers special advantages where at one production site several production lines with optionally different production capacities are present for the production of polyamide-6 from caprolactam. This is especially the case if the product of one or more production lines has to meet very high requirements in respect of purity and reproducibility. In such a situation recycling of extracted lactam and CD can be omitted on one or optionally more production lines without loss of feedstock, while one other production line is employed for complete re-use according to the invention of the extracted lactam from these production lines. This can be realized for instance by separately concentrating by evaporation and then collecting the extract from the various production lines. It is preferable, however, to collect the extract flows from the various production lines and to concentrate these in one evaporation unit and then use them in the process according to the invention.

In the case of the state-of-the-art processes, with only a VK column and without a special pretreatment, the above embodiments would result in unacceptably high CD content values and a highly failure-prone process. If the process according to the invention is used, being on-stream or off-stream of one of the production lines the extract from which is collected will only have a minimal effect on the composition of the polymerizate obtained from (a2).

The process according to the invention offers much flexibility. The hold-up time in the prepolymerization step can vary within wide limits, for instance between 0.5 and 8 hours, and is preferably chosen between 1 and 6 hours, while both shorter and longer hold-up times may offer an additional advantage in specific cases. The hold-up time in the condensation reactor can also vary within wide limits, for instance between 2 and 12 hours, while both shorter and longer hold-up times may offer an additional advantage in specific cases. For reasons of business economics the aim will in general be to have such a combination of hold-up times in steps (a1) and (a2) that the overall hold-up time (a1)+(a2) is as short as possible. The overall hold-up time across (a1)+(a2) is preferably less than 14 hours. This mainly depends on the desired polymerization degree of the polyamide-6 and the conditions of the polycondensation step and the amount of chain terminator applied.

The polymerizate leaving the polycondensation reactor (a2) generally has a CD content which is about equal to the equilibrium concentration of 0.8–1.0 wt. %. This means that the conditions for the extraction step (d) can be defined well. In contrast to the current views that the lowest possible CD content of the polymerizate should be aimed at, it appears that the CD content in the polyamide-6 in the process according to the invention can be reduced to a low level, i.e. <0.1 wt. %, with customary extraction techniques for the lactam washing, resulting in a polyamide-6 which is widely employable, for instance for engineering plastic applications.

The invention will now be further elucidated by means of the following examples and comparative experiments.

A BRIEF DESCRIPTION OF THE DRAWINGS

EXAMPLES I–II AND COMPARATIVE EXAMPLES A–D

A comparison is made between the operation of a polymerization unit (1) consisting of a current VK column and a polymerization unit (2) consisting of a prepolymerization reactor plus a downstream VK column (polymerization reactor) for three situations, viz. (a) feed consisting completely of fresh caprolactam, (b) feed consisting of fresh caprolactam and recycle lactam from a single production line, and (c) feed consisting of fresh lactam and recycle lactam from several production lines (1(a), 2(a), 1(b) and 1(c) are respectively Comparative Examples A, B, C and D; situations 2(b) and 2(c) are Examples I and II). These different configurations are shown diagrammatically in FIGS. 1–2. The total reactor volume is the same in all cases and the VK column has the same height in the two polymerization units. The temperature in the VK columns varies between approximately 245° and 270° C. The temperature at the bottom of the column is 245–250° C. The pressure is kept at atmospheric level.

The temperature of the prepolymerization column varies from about 245° C. at the inlet to 270° C. at the outlet. The pressure is set at 0.3 MPa. The prepolymerization reactor is a tubular reactor. A value of 0.45 is chosen for the volume ratio between the prepolymerization reactor and the VK column in (2).

In situation (b) the fraction of recycled lactam amounts to about 10% of the total lactam feed. Recycled and fresh lactam are both supplied at the top of the process. The CD content of the polymerization unit feed during recycling is equal to the CD content of the polymerizate which leaves the VK column, less 0.1 wt. %.

In the extraction such a ratio between supplied extraction agent and supplied polymerizate is chosen that the lactam content of the extract amounts to 10 wt. %. The evaporation step is carried out such that the water content of the feed to the top of the process amounts to approx. 2 wt. %.

With the lactam 0.07 wt. % of benzoic acid (relative to the lactam) is added as catalyst.

This concentration of benzoic acid, which also acts as chain terminator, allows a maximum polymerization degree which corresponds to a relative viscosity, $\eta_{rel}$, of 2.16–2.17 (measured in formic acid).

The CD content of the feed in situation (c) which comes from other polymerization lines is 0.84 wt. % (i.e. about equal to the extract of 2 production lines without recycle (situation (1a)).

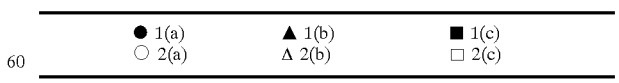

Figure 1:
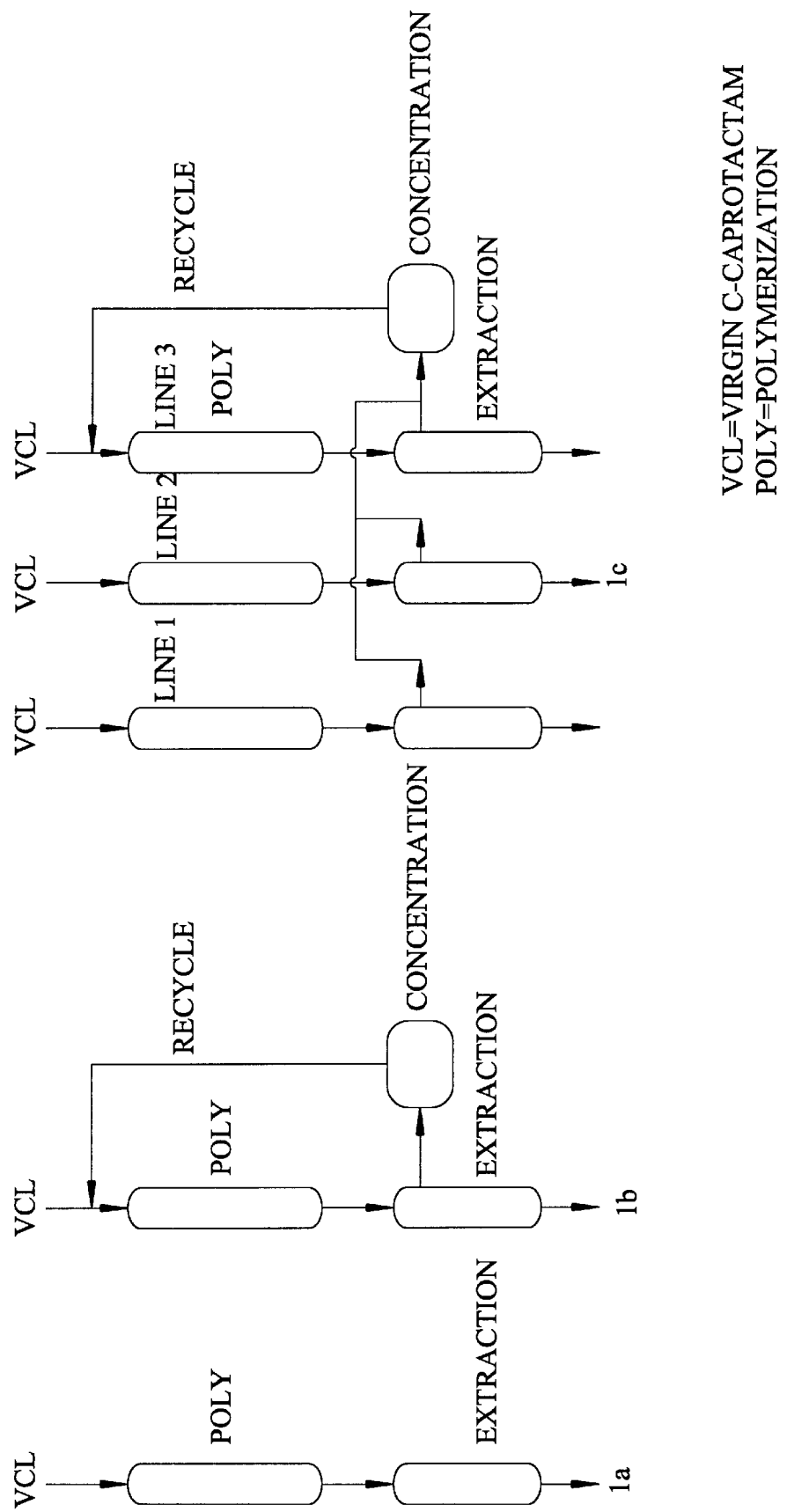
Figure 2:
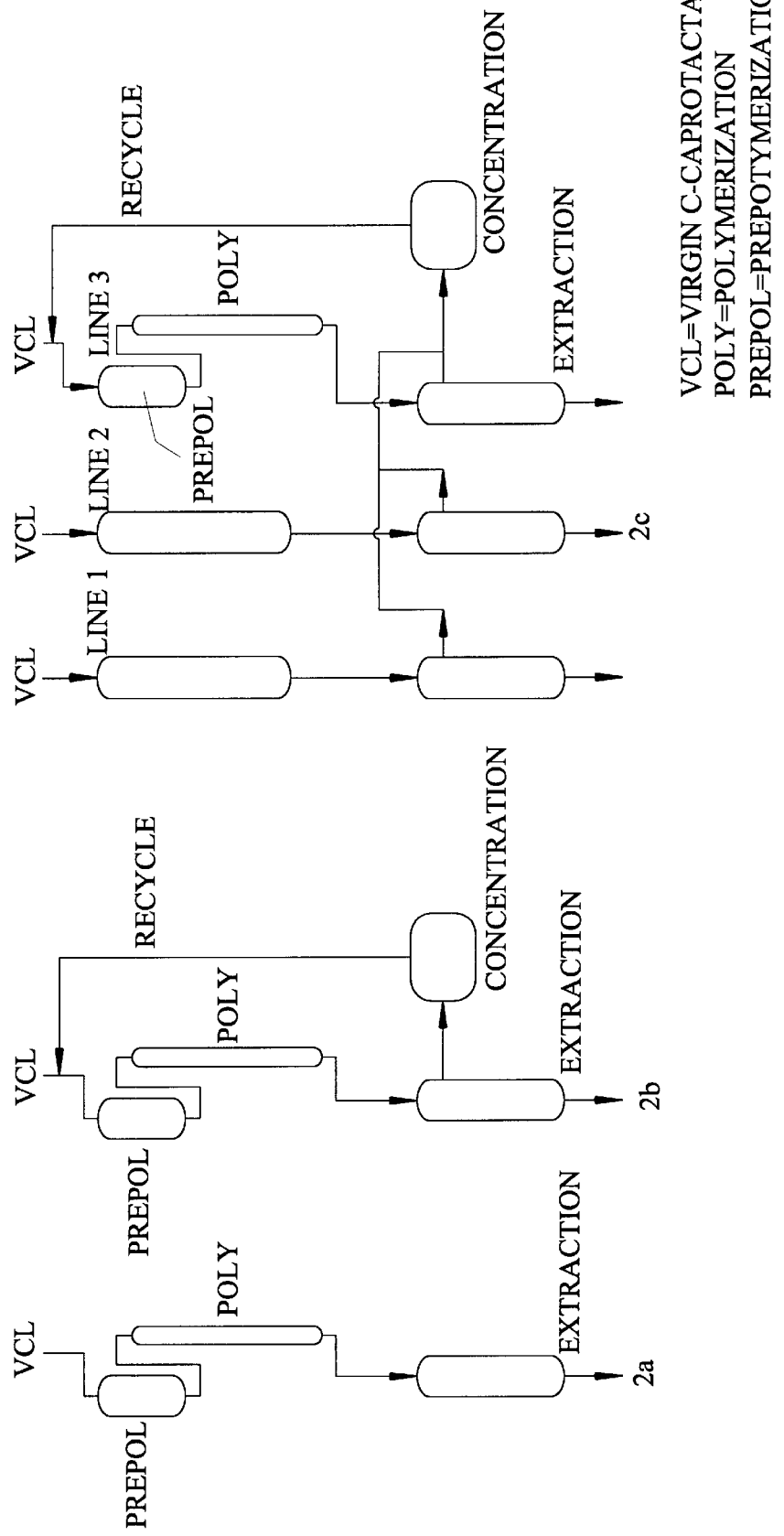
Figure 3:
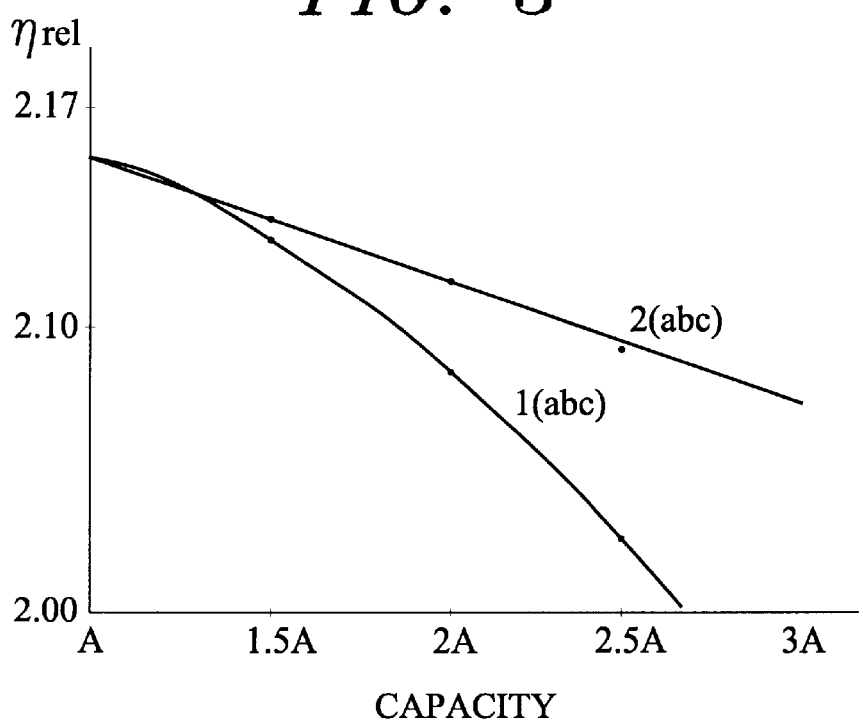
FIG. 3 shows the relation between $\eta_{rel}$, and the polyamide-6 production capacity (after extraction and drying) for the different configurations.
Figure 4:
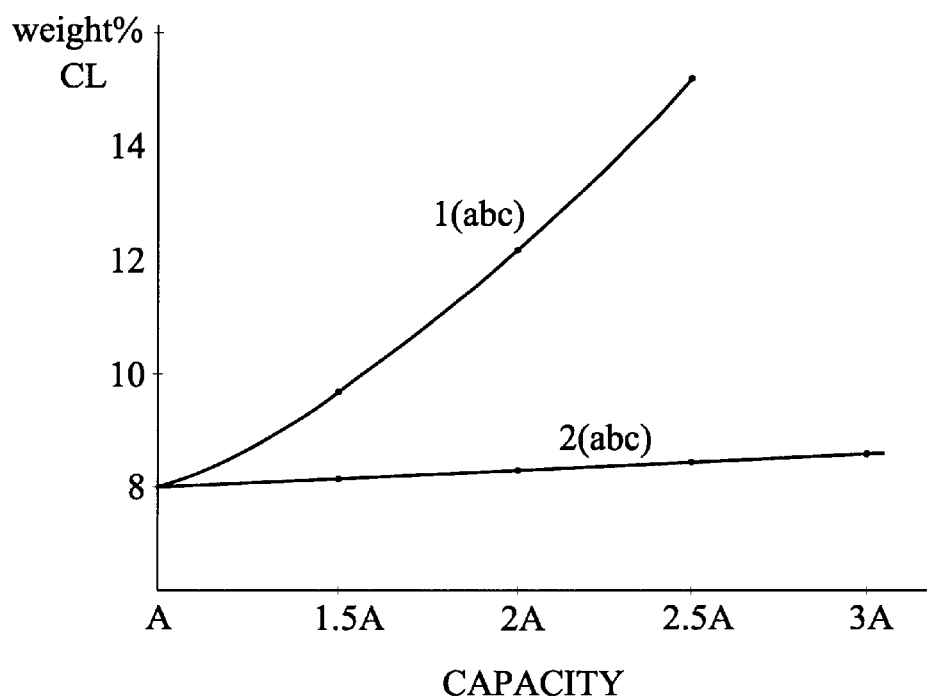
FIG. 4 shows the dependence of the ε-caprolactam (CL) content of the polymerizate which leaves the reactor.
Figure 5:
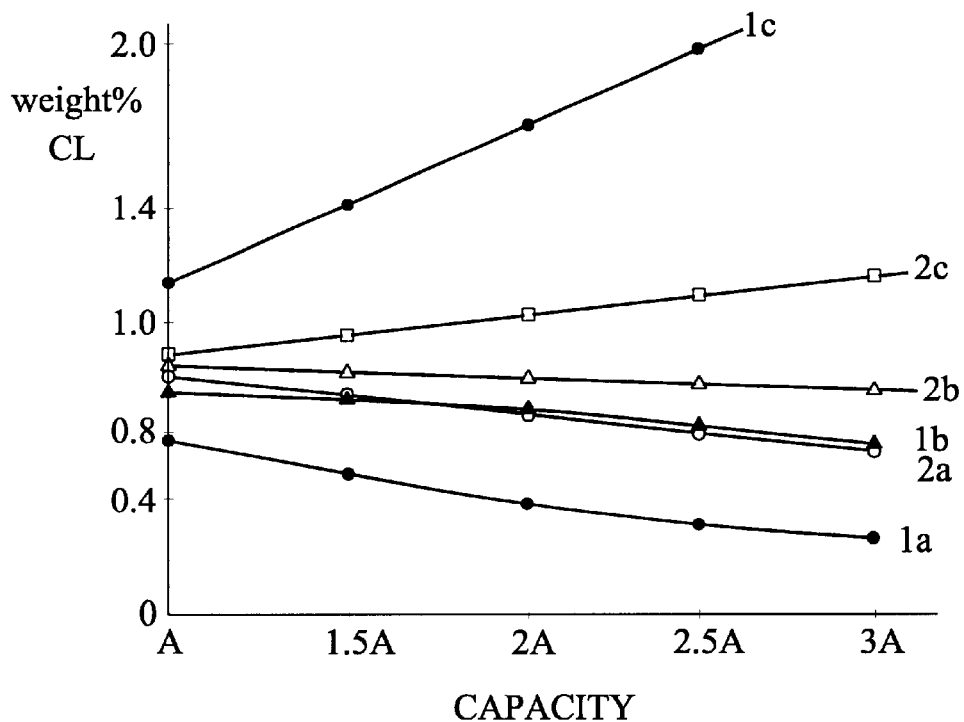
FIG. 5 shows the relation between CD content and production capacity.

From the results presented in FIGS. 3–5 the following conclusions can be drawn.

Both the caprolactam content and the polymerization degree (expressed in $\eta_{rel}$) are much less dependent on the production capacity in the process according to the invention.

The use of a two-step polymerization process results in a much higher CD content of the polymerizate in the situation without recycling of lactam (1a vs. 2a).

However, in the case of lactam recycling (situations b and c) this is not so any more and especially in situation c it appears that the CD content of the polymerizate of the one-step polymerization process (1c) is unacceptably high.

The process according to the invention—Examples I and II (situations 2b and 2c)—appears to be much less sensitive to the composition of the lactam feed and the throughput of the reactors (capacity).

EXAMPLE III

Figure 6:
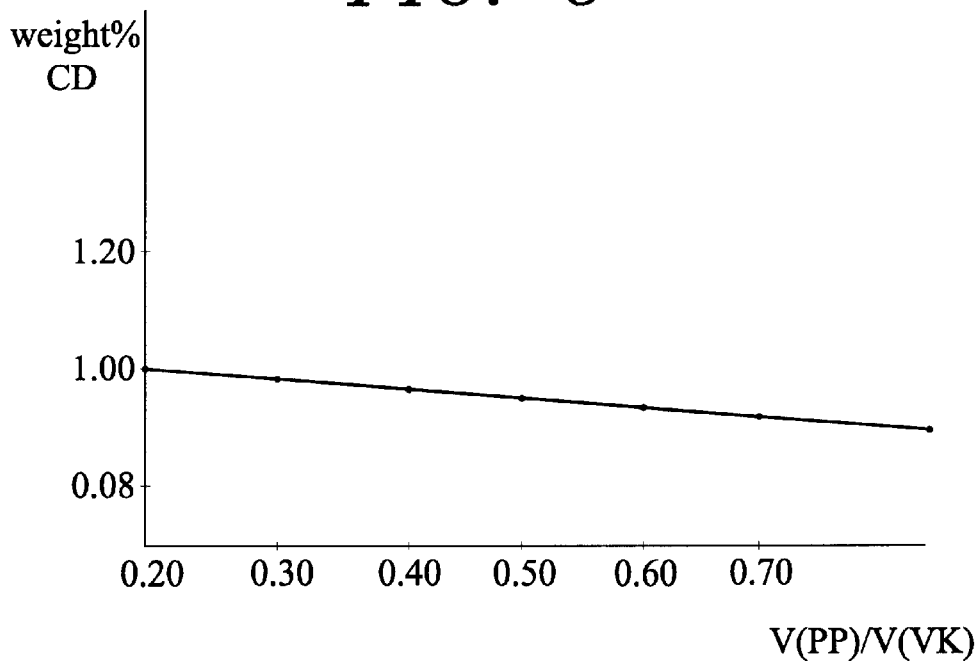

The effect of the volume ratio between polymerization reactor PP, and VK column (V(PP)/V(VK)) on the polymerizate's CD content has been determined at a constant production level of configuration 2c. A CD content of 0.58 wt. % originates from other polymerization lines. All lactam is supplied to the top of the prepolymerization column. The result is presented in FIG. 6. Here too the minor effect on the composition of the polymerizate is apparent.

EXAMPLE IV

In a preferred embodiment of the process according to the invention, the fresh lactam is supplied to the prepolymerization reactor as well as to the VK column. With a given reactor configuration V (PP)/V (VK)=0.42, with 24.5 wt. % of the total caprolactam feed consisting of recycled lactam having a CD content of 4 wt. % (relative to the caprolactam), a variable part of the fresh lactam is supplied to the VK column.

Figure 7:
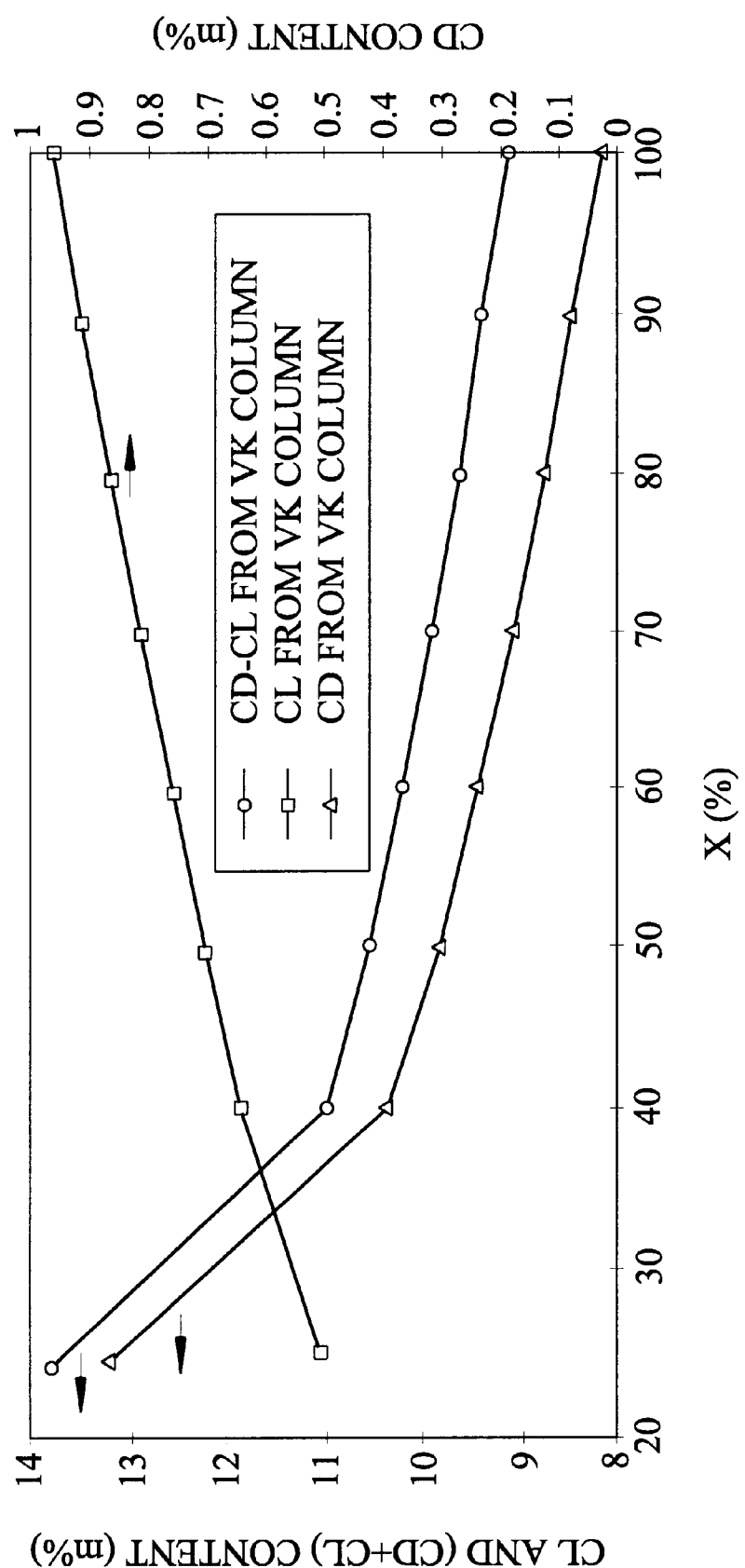

FIG. 7 shows the effect of splitting the feed of fresh caprolactam to the PP and VK on the caprolactam (CL) and cyclic dimer (CD) content of the polymerizate leaving the VK column ($\eta_{rel}$=2.20).

X indicates the fraction of the total caprolactam feed which is introduced into the process via the top of the polymerization. The highly favourable effect on the CD content of splitting the lactam feed between PP and VK is evident.

At X=60% for instance the cyclic dimer content is at the same level as in a one-step polymerization process with a VK column only, with 100% recycling of extracted caprolactam (situation 1b of comparative experiment B) from the unit's own polymerization line only.

This preferred embodiment results, among other things, in a smaller extraction unit being required for the removal of caprolactam and oligomers (in particular CD) from the polymerizate. If the extraction has to meet the following specifications: (CL+CD)=12 wt. % in the washing water and CD<0.075 wt. % in the final product, then the shift from X=100% to X=70% already means a 30% saving on the washing water volume. The caprolactam content of the polyamide-6 final product in this case still remains at 0.04 wt. %. At X=50% the saving under these conditions is almost 50%. Only if X<40% does a situation arise where the caprolactam content, owing to the poorer degree of conversion in the VK column, increases to such a level that, if the same criteria are maintained, the CL content of the polyamide-6 end product increases to an undesirable level.

It will be clear to those skilled in the art that the process according to the invention is not restricted to the production conditions stated in these examples, but that other conditions in terms of temperature, pressure, catalyst, reactor types, continuous or batchwise production are also applicable to the process according to the invention.

What is claimed is:

1. A process for the production of polyamide-6 from $\epsilon$-caprolactam, comprising:

(a) polymerizing $\epsilon$-caprolactam to polyamide-6 at a temperature above the melting point of polyamide-6, (b) recovering the polymerizate in solid form from polymerization step (a), (c) extracting the solid polymerizate obtained in (b), using a suitable solvent, with removal of non-converted monomer and oligomeric compounds from the polymerizate, (d) separating the extracted polymerizate from the extraction agent, (e) concentrating (by evaporation of the solvent) the solution of non-converted monomer and oligomeric compounds which has resulted from the extraction, (f) recycling of the concentrate obtained in (e) as starting material to the polymerization (a), wherein the polymerization under (a) is carried out in at least two successive steps:

(a1) at a temperature between 220 and 285° C. and an elevated pressure which remains below the vapour pressure of the reaction mixture supplied, with solvent being discharged via the vapour phase, for such a time that the polymerization process is initiated; and (a2) while letting down the pressure prevailing in (a1) to approximately atmospheric or, if desirable, reduced pressure, the reaction mixture obtained in (a1), further called "the prepolymerizate", is polymerized further, at a temperature above the melting point of polyamide-6, until the required degree of polymerization is reached.

2. A process according to claim 1, wherein the concentrate obtained in (e) is recycled to the prepolymerization step (a1).

3. A process according to claim 2, wherein the rest of the caprolactam required for polymerization is supplied to the prepolymerization step (a1).

4. A process according to claim 2, wherein at least part of the rest of the fresh caprolactam required for polymerization is supplied to the polymerization step (a2).

5. A process according to claim 1, wherein the amount of concentrate recycled in (f) has been obtained by combining the concentrate flows of several polyamide-6 production lines.

6. A process according to claim 1, wherein the concentration step (e) the solutions of non-converted monomer and oligomeric compounds obtained from more than one polyamide-6 production line in the extraction step (c) and the subsequent separation (d) are concentrated and the resulting concentrate is used as starting material in the polymerization process of one polyamide production line.

7. A process according claim 1, wherein the production takes place in a continuous process.

8. A process according to claim 7, wherein the polymerization step (a2) is carried out in a VK column.

9. A process according to claim 7, wherein the prepolymerization step (a1) is carried out in a tubular reactor.

10. A process according to claim 1, wherein the hold-up time in reactor step (a1) is between 1 and 6 hours.

11. A process according to claim 1, wherein the hold-up time in reactor step (a2) is between 2 and 12 hours.

12. A process according to claim 1, wherein reaction step (a2) is carried out at approximately atmospheric pressure.

13. A process according to claim 1, wherein the integral concentration of cyclic dimer which is present in the caprolactam that is introduced into the polymerization process is higher than 1.0 wt. %.

* * * * *